United States Patent Office 2,902,377
Patented Sept. 1, 1959

2,902,377
GLASS COMPOSITION

James E. Duncan, Brackenridge, Pa., assignor to Pittsburgh Plate Glass Company, Allegheny County, Pa., a corporation of Pennsylvania No Drawing. Application January 7, 1958
Serial No. 707,482

8 Claims. (Cl. 106—52)

The present invention relates to a family of glass compositions suitable to provide a series of opaque glasses having permanent colors ranging from tan to brown. These glass compositions provide a set of colors that are pleasing to the eye and enhance the beauty of a structure whose walls are covered with a glass of this type.

Opaque glasses have found widespread adoption as a structural medium, particularly in the construction of storefronts, kitchens, bathrooms and the like. Production of these glasses by a pot casting method in a range of colors has been very well standardized. The glasses are annealed according to conventional practices and are polished on at least one surface in accordance with conventional, polished, plate glass practices. These manufacturing practices are set forth in the Glass Manual published by Pittsburgh Plate Glass Company, copyrighted 1946. The following U.S. patents describe some of these glasses: 1,956,176 (cream), 2,224,469 (opal base), 2,237,042 (red or pink), 2,282,601 (ivory), 2,394,502 (white), 2,599,349 (green), 2,683,666 (ivory), and 2,776,900 (tan).

It is an object of the present invention to provide a family of opaque glasses having colors ranging from tan to brown.

Another object of the present invention is to provide such a family of opaque glasses containing relatively small amounts of selenium. Other objects and advantages of the invention will become apparent with the following detailed description of the invention.

It has been found that desirable opaque glasses ranging in color from light tan to brown are readily reproducible when made with 0.03 to 0.2 percent by weight of selenium, 1 to 3 percent by weight of iron oxide and 1 to 6 percent by weight of fluorine. Calculated compositions of glasses within the purview of the invention are set forth in the table below. These glasses can be made by conventional glass making batch materials according to conventional procedures as further described below.

Table

[Percent by Weight]

| Ingredients | 1 | 2 | 3 | 4 | 5 | Range |
|---|---|---|---|---|---|---|
| $SiO_2$ | 70.3 | 69.5 | 68.9 | 61.6 | 73.5 | 55–75 |
| $Na_2O$ | 14.3 | 14.3 | 11.8 | 17.4 | 13.6 | 5–20 |
| $K_2O$ | 1.8 | 1.8 | 4.6 | 1.4 | 3.2 | 0–10 |
| CaO | 0.6 | 0.6 | 0.6 | 7.2 | | 0–10 |
| $Al_2O_3$ | 9.6 | 9.6 | 9.7 | 3.1 | 6.9 | 2–12 |
| F | 2.6 | 2.6 | 2.5 | 5.8 | 2.0 | 1–6 |
| $As_2O_5$ | 0.9 | 0.9 | 0.9 | 0.5 | 0.5 | 0.1–2.0 |
| ZnO | | | | 4.1 | | 0–5 |
| Se | 0.03 | 0.06 | 0.05 | 0.1 | 0.15 | 0.03–0.2 |
| $Fe_2O_3$ | 1.0 | 1.7 | 2.0 | 1.2 | 1.0 | 1.0–3.0 |
| | 101.13 | 101.06 | 101.05 | 102.4 | 100.85 | |
| Less oxygen correction | −1.09 | −1.09 | −1.05 | −2.4 | −0.84 | |
| | 100.04 | 99.97 | 100.00 | 100.0 | 100.01 | |
| Color | light tan | tan | light brown | light tan | light tan | |

The oxygen equivalent of fluorine is set forth in the table because of the manner of calculating the composition of the glass. The fluorine shown in the composition in the tables is understood to be present in the glasses in some combined form but not as a gas. It is not known exactly how the fluorine is combined, but is is probably combined as a fluoride such as NaF, KF, or CaF.

In an analysis of a glass, it is customary to analyze only for the elements and then list the presence of these elements in the glass as oxides. In cases where some fluorine is present in the glass, it is probably present as a fluoride compound with a cation in the glass and thus replaces a stoichiometric equivalent of oxygen with this cation. Thus, it is convenient to show the amount of fluorine in percent by weight as fluorine and then subtract from the sum total percentages of the glass composition based on oxides, its stoichiometric equivalent of oxide in percent by weight.

Silica is the principal glass former. A range of $SiO_2$ between 55 and 75 percent by weight is preferred. The durability of a glass containing less than 55 percent by weight $SiO_2$ is poor and it is difficult to melt a glass containing over 75 percent by weight $SiO_2$. There is also a tendency for glass containing more than the desired maximum of $SiO_2$ to devitrify.

The alkali metal oxides, $Na_2O$ and $K_2O$, are the principal fluxes. $Li_2O$ may also be used to replace part of the $Na_2O$ and $K_2O$, however, this material increases the cost of the batch. It is preferred to have between 11 and 21 percent by weight of total alkali metal oxide in the glasses of the invention. Glasses having below 11 percent by weight alkali metal oxide are difficult to melt. The glasses have poor durability when the total alkali metal oxide content exceeds 21 percent by weight.

The alumina increases the working range of the glasses. If more than 12 percent by weight of $Al_2O_3$ is included in the glasses, an excessive amount of alkali and fluorine is required to compensate for the stiffness imparted to the glasses by the alumina. The glasses have too narrow a working range if less than 2 percent by weight of $Al_2O_3$ is employed.

Up to 10 percent by weight of CaO may be included in the glasses. The presence of CaO requires a high percentage of fluorine for equivalent opacity. CaO tends to produce smaller fluoride crystals and a more uniform opacity. For glasses wherein a low alkali metal oxide content is desired and a high percentage of fluorine is used as a flux, a high percentage of CaO is employed to control the amount of opacity. Glasses containing above 10 percent by weight CaO require an extremely high percentage of fluorine. This results in a glass having unsatisfactory durability. To obtain the maximum opacity with the minimum amount of fluorine, the glasses should be substantially free from CaO. It is preferred, however, to produce glasses containing approximately 0.6 percent by weight CaO in order to obtain a proper balance of the other ingredients.

Other bivalent metal oxides such as MgO, ZnO and BaO may also be substituted for part or all of the CaO, but it has been found that the increased cost of these other materials does not justify their use. When such substituted bivalent metal oxides are used, the maximum total weight of the bivalent metal oxides in the glasses may be increased to about 12 percent by weight of the glass.

Arsenic oxide is employed as a refining agent to aid in removing undissolved gases in the molten glass. More than 2 percent by weight of the refining agent does not appear to be beneficial to the finished glasses. Arsenic oxide is preferred to the use of antimony oxide as a refining agent.

Fluorine is used as an opacifying agent. It also acts as a flux and a colorant. The amount of white or opacity has a very great effect on the intensity of the tan or brown color. It is preferred to have between 2.5 and 3.0 percent by weight F in the glasses, although as high as 6 percent or as low as 1 percent by weight may be used depending upon the percentages of the other constituents, the degree of annealing and the intensity of the color required. If too much fluorine is included, the glasses will opacify too rapidly, thereby forming opaque glasses having a lighter color than that desired. If too little fluorine is employed in combination with the other colorants, colored glasses having a milky, translucent appearance are produced instead of glasses having the desired opacity.

Selenium and iron oxide are the colorants employed in combination with fluorine to produce the tan and brown opaque glasses. Only small amounts of these colorants are required. The amount of selenium may vary from 0.03 to 0.2 percent by weight and the amount of iron oxide may vary from 1.0 to 3.0 percent by weight. Brown opaque glasses are produced when the iron oxide content approaches the upper limit of the range of iron oxide, whereas tan shades are produced as the iron oxide content approaches the lower limit.

The glasses of the invention may be produced from conventional glass making materials properly compounded and thoroughly mixed so as to yield, when reacted, glasses of the desired ultimate composition. Suitable batch materials include sand, soda ash, potassium carbonate, sodium nitrate, aluminum hydrate, nepheline syenite, feldspar, arsenious oxide, antimony oxide, sodium silico fluoride, fluorspar, zinc oxide, barium carbonate, magnesium oxide, selenium and iron oxide.

Various size pots or crucibles may be employed and the melting temperatures and times will vary according to the amount being formed. Conditions herein recited may be employed to make eight pounds of glass in a refractory pot in a furnace heated by the controlled combustion of natural gas.

An empty pot is preheated in the furnace at a furnace temperature of about 2200° F. A portion of the mixed batch is ladled into the preheated pot and the furnace temperature is gradually increased until it reaches approximately 2500° F. in one hour at which time a second charge of the remaining batch is added to the pot. The pot and its contents are heated for an additional hour and a half and the furnace temperature is gradually increased to 2650° F. At the end of this time, the glass is formed in a molten condition. The molten glass is then held at a furnace temperature of 2650° F. for one hour to permit the conclusion of the chemical reactions, the exclusion of gases and the substantial homogenization of the glass. It is desired that the glass be produced under neutral to slightly oxidizing conditions in the melting furnace or container.

The refined glass is cooled to approximately 2200° F. and the pot is removed from the furnace. The contents of the pot are poured on a cast iron table where the glass is rolled in the form of a plate. The plate is placed in a kiln and cooled from a temperature of about 1050° F. to 850° F. at a rate of about 4° F. per minute. During this cooling operation, the glass is annealed, the fluoride crystals are formed and the color develops as a result of using a combination of the proper proportions of fluorine and the other colorants. After cooling, the glass may be ground and polished.

The glasses set forth above have colors which may be described as having certain radiant energy reflectance values over the visible portion of the spectrum. The glasses of the present invention have radiant energy reflectance values of from 10 to 40 percent at 400 millimicrons, 12 to 43 percent at 450 millimicrons, 15 to 46 percent at 500 millimicrons, 20 to 51 percent at 550 millimicrons, 25 to 56 percent at 600 millimicrons and 20 to 57 percent over the remainder of the visible portion of the spectrum up to and including 750 millimicrons wavelength.

The reflectance values of the glass set forth in column 2 of the table above are set forth below to illustrate a glass having reflectance properties within the above specified ranges. These reflectance values are relative to magnesium oxide.

| Wave length (mmu) | Percent reflectance |
|---|---|
| 400 | 20.5 |
| 420 | 21.5 |
| 440 | 22.8 |
| 460 | 25.3 |
| 480 | 26.9 |
| 500 | 28.6 |
| 520 | 31.2 |
| 540 | 34.3 |
| 560 | 37.5 |
| 580 | 40.4 |
| 600 | 43.1 |
| 620 | 44.4 |
| 640 | 45.0 |
| 660 | 45.2 |
| 680 | 44.7 |
| 700 | 43.7 |
| 720 | 42.4 |
| 740 | 41.1 |
| 750 | 40.7 |

Although the present invention has been described with respect to specific details of certain embodiments thereof, it is not intended that such details be limitations upon the scope of the invention except insofar as set forth in the following claims.

This application is a continuation-in-part of my copending application Serial No. 558,619, filed January 12, 1956 and now abandoned.

I claim:

1. A tan to brown, opaque glass consisting essentially of the following ingredients in percent by weight: 55 to 75 percent $SiO_2$, 5 to 20 percent $Na_2O$, 0 to 10 percent $K_2O$, the sum total of alkali metal oxides being 11 to 21 percent, 2 to 12 percent $Al_2O_3$, 0.1 to 2 percent $As_2O_5$, 1 to 6 percent F, 0.03 to 0.2 percent Se and 1 to 3 percent $Fe_2O_3$.

2. A tan to brown, opaque glass consisting essentially of the following ingredients in percent by weight: 55 to 75 percent $SiO_2$, 5 to 20 percent $Na_2O$, 0 to 10 percent $K_2O$, the sum total of alkali metal oxides ranging from 11 to 21 percent, 2 to 12 percent $Al_2O_3$, up to 12 percent of a bivalent metal oxide selected from the group consisting of 0 to 10 percent CaO, 0 to 12 percent MgO, 0 to 12 percent BaO, and 0 to 5 percent ZnO, 0.1 to 2 percent $As_2O_5$, 1 to 6 percent F, 0.03 to 0.2 percent Se and 1 to 3 percent $Fe_2O_3$.

3. An opaque glass as defined in claim 1, said glass having radiant energy reflectance values relative to magnesium oxide of from 10 to 40 percent at 400 millimicrons, 12 to 43 percent at 450 millimicrons, 15 to 46 percent at 500 millimicrons, 20 to 51 percent at 550 millimicrons, 25 to 56 percent at 600 millimicrons and 20 to 57 percent over the remainder of the visible portion of the spectrum up to and including 750 millimicrons wavelength.

4. A glass having substantially the following composition wherein the ingredients are set forth in percent by weight: 70.3 percent $SiO_2$, 14.3 percent $Na_2O$, 1.8 percent $K_2O$, 0.6 percent CaO, 9.6 percent $Al_2O_3$, 2.6 percent F, 0.9 percent $As_2O_5$, 0.03 percent Se, and 1.0 percent $Fe_2O_3$, the total exceeding 100 percent by an amount of oxygen stoichiometrically equivalent to the amount of fluorine present, said amount of oxygen not being present in the glass.

5. A glass having substantially the following composition wherein the ingredients are set forth in percent by weight: 69.5 percent $SiO_2$, 14.3 percent $Na_2O$, 1.8 percent $K_2O$, 0.6 percent CaO, 9.6 percent $Al_2O_3$, 2.6 percent F, 0.9 percent $As_2O_5$, 0.06 percent Se, and 1.7 percent $Fe_2O_3$, the total exceeding 100 percent by an amount of oxygen stoichiometrically equivalent to the amount of fluorine present, said amount of oxygen not being present in the glass.

6. A glass having substantially the following composition wherein the ingredients are set forth in percent by weight: 68.9 percent $SiO_2$, 11.8 percent $Na_2O$, 4.6 percent $K_2O$, 0.6 percent CaO, 9.7 percent $Al_2O_3$, 2.5 percent F, 0.9 percent $As_2O_5$, 0.05 percent Se, and 2.0 percent $Fe_2O_3$, the total exceeding 100 percent by an amount of oxygen stoichiometrically equivalent to the amount of fluorine present, said amount of oxygen not being present in the glass.

7. A glass having substantially the following composition wherein the ingredients are set forth in percent by weight: 61.6 percent $SiO_2$, 17.4 percent $Na_2O$, 1.4 percent $K_2O$, 7.2 percent CaO, 3.1 percent $Al_2O_3$, 5.8 percent F, 0.5 percent $As_2O_5$, 4.1 percent ZnO, 0.1 percent Se and 1.2 percent $Fe_2O_3$, the total exceeding 100 percent by an amount of oxygen stoichiometrically equivalent to the amount of fluorine present, said amount of oxygen not being present in the glass.

8. A glass having substantially the following composition wherein the ingredients are set forth in percent by weight: 73.5 percent $SiO_2$, 13.6 percent $Na_2O$, 3.2 percent $K_2O$, 6.9 percent $Al_2O_3$, 2.0 percent F, 0.5 percent $As_2O_5$, 0.15 percent Se, and 1.0 percent $Fe_2O_3$, the total exceeding 100 percent by an amount of oxygen stoichiometrically equivalent to the amount of fluorine present, said amount of oxygen not being present in the glass.

References Cited in the file of this patent

UNITED STATES PATENTS

| | | |
|---|---|---|
| 2,224,469 | Blau | Dec. 10, 1940 |
| 2,309,071 | Sullivan et al. | Jan. 19, 1943 |
| 2,443,142 | Lyle | June 8, 1948 |